April 14, 1959  E. H. KRUSE ET AL  2,881,924
ELECTRICAL FIXTURE MOUNTING SUPPORT
Filed April 12, 1954

INVENTORS.
EUGENE H. KRUSE
MAHLON E. RIEKE
BY
Lockwood, Galt, Woodard, & Smith
ATTORNEYS United States Patent Office 2,881,924
Patented Apr. 14, 1959

2,881,924

ELECTRICAL FIXTURE MOUNTING SUPPORT

Eugene H. Kruse, Hamilton, and Mahlon E. Rieke, Auburn, Ind.

Application April 12, 1954, Serial No. 422,446

2 Claims. (Cl. 211—26)

The present invention relates to electrical fixture mounting supports and more particularly to bracket type strips for mounting the usual electrical switch and receptacle protective boxes between studs of the usual frame construction of a house.

Work involved in installing electrical wiring in the usual wood frame type of house conventionally includes the use of certain types of material which are approved by governmental or the like authorities having jurisdiction. Some if not all of these authorities require the use of so-called switch or receptacle protective boxes which are formed essentially in box shape and are made of a suitable metal. One side of the box is open for receiving either a switch or receptacle sub-assembly after the box has been suitably secured in its proper position relative to the house frame studding. It is conventional practice in securing such boxes to use strip type mounts which may be secured to the studs by the use of nails or screws and which extend horizontally between the studs. Ordinarily, two of these mounting strips are used and are vertically spaced to receive therebetween the aforementioned box. Flange bracket on opposite ends of the box are used to secure the latter to the upper and lower strips. After this is accomplished, it is only necessary to lay wallboard or perform plastering work in a conventional manner with an opening left in the wall in registry with the box. Thereafter, the final step is merely to assemble the electrical switch or receptacle into the box and to connect the associated wires.

As is well-known, the cost of housing has materially increased over the past year due to increased costs of both labor and material. Therefore, a building contractor must have ever present before him cost-reducing techniques and supplies, and it is to this economical problem to which the present invention is primarily related. The present invention accomplishes a savings in the respect of being less costly to manufacture in the first instance and, secondly, requires less labor to install in a house or the like.

In view of the foregoing, it is an object of this invention to provide a fixture mounting support which leads to increased production by electrical contractors in wiring a building. Ancillary to this object, it is also an object to reduce the manufacturing costs of these supports such that they may be supplied to electrical contractors at a lower price.

It is yet another object of this invention to provide fixture mounting supports which are light in weight, rigid and durable.

It is another object of this invention to provide fixture mounting supports which secure the aforementioned boxes against both vertical and horizontal movement.

It is still another object of this invention to provide fixture mounting supports which are so arranged as to receive either single boxes or a plurality of ganged boxes which are assembled in side-by-side relation, each box receiving individual support.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
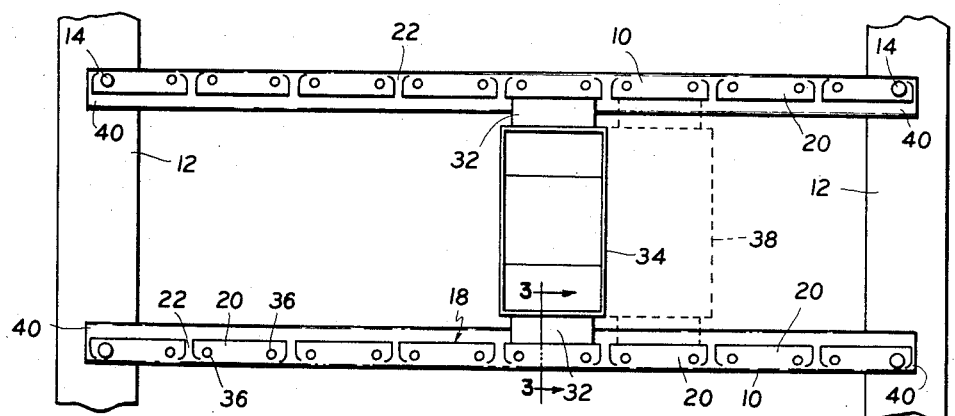
Fig. 1 is an elevational illustration showing one embodiment of this invention as it is conventionally secured to the studding of a frame building construction.

Referring to the drawings, two fixture mounting supports 10 of this invention are shown as being horizontally supported by two usual upright frame building studs 12 of wood or the like material. Preferably, the mounting supports 10 are secured to the studs 12 by means of nails 14, but obviously other mounting means, such as screws, may be used.

Each support 10 is fabricated of strip sheet metal material which is generally flat and in ribbon-like form in its raw state. The edges of this raw material are bent over to provide longitudinally extending, right-angle flanges 16 which serve to stiffen the support 10 against transverse bending.

The central portion of the strip between the flanges 16 are longitudinally lanced along lines generally indicated by the reference numeral 18 and press-formed to provide a plurality of elongated, longitudinally spaced, raised brackets 20. These brackets 20 are substantially identical in shape and are disposed in collinear alignment on the strip 10, the brackets being separated by flat strip portions indicated by the reference numeral 22. The importance of this flat portion will become apparent from the following description.

Figure 2:
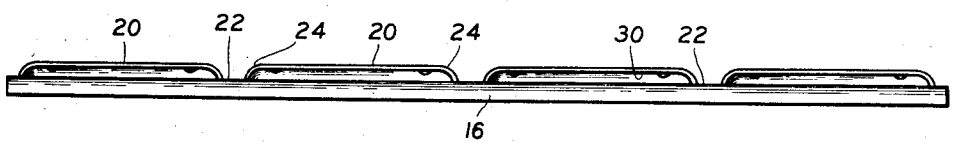
Fig. 2 is a top plan view of the lower mounting strip of Fig. 1.
Figure 3:
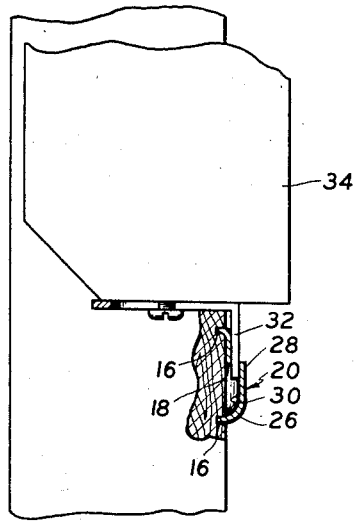
Fig. 3 is an enlarged fragmental section taken along section line 3—3 of Fig. 1, but showing the bracket flange of a box as mounted on the strip support of Fig. 2.

Each bracket 20 is pressed from the strip material in substantially the shape illustrated in Figs. 2 and 3, each bracket having curved end walls 24 and curved bottom walls 26. The raised portion of the bracket 20 is formed parallel with the main body of the strip 10, as indicated by the reference numeral 28, and is spaced therefrom to provide an aperture or opening 30 (Figs. 2 and 3). The size of this opening 30 and the spacing between the bracket portion 28 and the adjacent portion of the strip is made substantially equal to the thickness of the usual bracket flange 32 of the electrical fixture box 34. In forming each bracket 20, the ends 24 and bottom 26 are preferably radiused to facilitate forming.

The brackets 20 are perforated in the opposite ends thereof, as indicated by the reference numeral 36, these perforations 36 serving to receive nails 14 for securing the strips 10 to the usual studs 12.

As seen in Fig. 1, there are two mounting strips 10 so secured to the studs 12 as to receive the flanges 32 of the opposite ends of the box 34. The brackets 20 are so sized that the flanges 32 will be snugly received therein such that the box 34 will be held against both endwise and sidewise movement. Thus, the box is firmly and securely held in position.

Should it be desired to gang a series of boxes 34 together, the boxes need only be joined in the usual manner as indicated by the dashed line box 38 such that the mounting flanges will be received by the respective juxtaposed brackets 20. By spacing the brackets 20 a proper predetermined distance apart, any number of boxes may be ganged together and each will thereby receive individual support by the mounting strips 10.

From the foregoing, it will be apparent that the invention may be made simply by use of progressive stamping operations from flat steel strip stock which is relatively inexpensive and easily formed. By reason of the ease with which these mounting strips are formed, which is due to the particular design thereof, it is obvious that manufacturing costs can be held to a minimum.

A manufacturer may supply these strips either in extremely long lengths or in lengths of standard size, but if he should supply the former, the electrical contractor may easily break the strips at the flat portions 22 between brackets 20 to any desired length.

As illustrated in both Figs. 1 and 3, when nails 14 are used to mount the strips 10 it is only necessary to hammer the nails in to the extent whereby the strip ends 40 are flattened and the flanges 16 are driven into the wood. The flanges 16 thereupon become securing means and tend to retain the strips 10 rigidly mounted.

As mentioned earlier, by reason of this particular invention, it is possible to manufacture and sell mounting supports at a lower price than was previously possible. Also, because of the simplicity of design, it is almost impossible for a worker to make an error in installation such that much labor is saved. Further, there are no right or left-hand parts to remember, and it is only necessary to mount the two spaced brackets 10 in juxtaposition in order to properly mount the usual box 34.

While a few of the advantages of this invention have been outlined in the foregoing, others will become apparent to a person skilled in the art.

What is claimed is:

1. An electrical fixture mounting support comprising an elongated rigid member made of flat strip steel, right-angle flanges on the longitudinal edges of said member for stiffening the latter against transverse bending, and a plurality of raised brackets on said member which are longitudinally spaced, said brackets being elongated and extending in the direction of the longitudinal dimension of said member, each bracket having closed ends and bottom portions which merge with said member and which thereby form barriers against an inserted fixture flange from moving endwise in said bracket or in the direction of said bottom, said closed ends extending along the entire width dimension of the respective bracket, each bracket further having an elongated aperture which opens in the plane of said member whereby a flat fixture flange may be moved parallel to said member and inserted into said aperture.

2. An electrical fixture mounting support comprising an elongated rigid member made of flat strip steel, right-angle flanges on the longitudinal edges of said member for stiffening the latter against transverse bending, said member having opposite flat ends provided with mounting apertures respectively, and a plurality of raised brackets on said member which are longitudinally spaced, said brackets being elongated and extending in the direction of the longitudinal dimension of said member, each bracket having closed ends and bottom portions which merge with said member and which thereby form barriers against an inserted fixture flange from moving endwise in said bracket or in the direction of said bottom, said closed ends extending along the entire width dimension of the respective bracket, each bracket further having an elongated aperture which opens in the plane of said member whereby a flat fixture flange may be moved parallel to said member and inserted into said aperture, the spacing between said brackets being equal and of predetermined dimension whereby the flanges of adjacent ganged boxes may be inserted into the adjacent apertures for receiving support by the respective brackets.

References Cited in the file of this patent

UNITED STATES PATENTS

| | | |
|---|---|---|
| 1,056,759 | Mallery | Mar. 18, 1913 |
| 1,211,182 | Kruse | Jan. 2, 1917 |
| 1,583,474 | Kruse | May 4, 1926 |
| 1,930,928 | Dunlap | Dec. 28, 1928 |
| 2,103,106 | Yurkovitch | Dec. 21, 1937 |
| 2,209,725 | Yerton | Feb. 2, 1943 |
| 2,679,373 | Henley | May 25, 1954 |